United States Patent
Gill et al.

(10) Patent No.: US 10,649,679 B2
(45) Date of Patent: May 12, 2020

(54) CONTAINERIZED APPLICATION EXTENSIONS IN DISTRIBUTED STORAGE SYSTEMS

(71) Applicant: Nutanix, Inc., San Jose, CA (US)

(72) Inventors: Binny Sher Gill, San Jose, CA (US); Jon Carlo Gueco, San Jose, CA (US); Vinod Gupta, Fremont, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/360,077

(22) Filed: Nov. 23, 2016

(65) Prior Publication Data

US 2020/0034062 A1    Jan. 30, 2020

(51) Int. Cl.
*G06F 3/06* (2006.01)

(52) U.S. Cl.
CPC .......... *G06F 3/0647* (2013.01); *G06F 3/0604* (2013.01); *G06F 3/067* (2013.01); *G06F 3/0659* (2013.01); *G06F 3/0664* (2013.01)

(58) Field of Classification Search
CPC .......................... G06F 9/44526; G06F 9/44584
See application file for complete search history.

(56) References Cited

U.S. PATENT DOCUMENTS

| | | | |
|---|---|---|---|
| 8,381,231 B2 | 2/2013 | Kacin et al. | |
| 8,549,518 B1 | 10/2013 | Aron et al. | |
| 8,601,473 B1 | 12/2013 | Aron et al. | |
| 8,649,771 B1 | 2/2014 | Faaborg et al. | |
| 8,850,130 B1 | 9/2014 | Aron et al. | |
| 9,223,966 B1 | 12/2015 | Satish et al. | |
| 9,342,784 B1 | 5/2016 | Rajagopal et al. | |
| 9,772,866 B1 | 9/2017 | Aron et al. | |
| 9,800,517 B1* | 10/2017 | Anderson | H04L 47/70 |
| 2005/0091213 A1 | 4/2005 | Schutz et al. | |
| 2006/0059230 A1 | 3/2006 | Dykas et al. | |
| 2007/0083512 A1* | 4/2007 | Pepin | G06F 9/44526 |
| 2007/0198656 A1 | 8/2007 | Mazzaferri et al. | |
| 2007/0260831 A1* | 11/2007 | Michael | G06F 9/4401 711/162 |
| 2009/0217296 A1* | 8/2009 | Gebhart | G06F 9/45558 719/317 |

(Continued)

OTHER PUBLICATIONS

Wilson, Megan, "Advantages of Graphical User Interface Examples", Apr. 25, 2016 (Year: 2016).*

(Continued)

*Primary Examiner* — Edward J Dudek, Jr.
(74) *Attorney, Agent, or Firm* — Vista IP Law Group, LLP

(57) ABSTRACT

Systems for distributed data storage. A user accesses a user interface in a distributed virtualization system comprising computing nodes that support virtualized controllers that include preconfigured APIs to receive application extension modules. The system receives a user command from a user interface at the virtualized controller, the user command corresponding to a download request for at least one application extension. A successful download and integration event causes integration of the containerized application extension into the system. The additional functionality of the containerized application extension is offered to the user. The user can address additional functionality of the containerized application extension through a user interface.

21 Claims, 12 Drawing Sheets

(56) References Cited

U.S. PATENT DOCUMENTS

| | | |
|---|---|---|
| 2009/0300414 A1 | 12/2009 | Huang et al. |
| 2009/0307435 A1 | 12/2009 | Nevarez et al. |
| 2011/0078790 A1 | 3/2011 | Fazunenko et al. |
| 2011/0185292 A1 | 7/2011 | Chawla et al. |
| 2012/0005673 A1 | 1/2012 | Cervantes et al. |
| 2012/0110574 A1 | 5/2012 | Kumar |
| 2012/0117562 A1 | 5/2012 | Jess et al. |
| 2012/0151568 A1 | 6/2012 | Pieczul et al. |
| 2012/0167079 A1 | 6/2012 | Banerjee et al. |
| 2012/0191908 A1 | 7/2012 | North et al. |
| 2013/0185715 A1 | 7/2013 | Dunning et al. |
| 2013/0198828 A1 | 8/2013 | Pendergrass et al. |
| 2013/0275886 A1 | 10/2013 | Haswell et al. |
| 2013/0290399 A1* | 10/2013 | Gordon .............. H04L 67/1097 709/201 |
| 2014/0020043 A1 | 1/2014 | Anand et al. |
| 2014/0052864 A1 | 2/2014 | Van Der et al. |
| 2014/0075426 A1 | 3/2014 | West et al. |
| 2014/0082634 A1 | 3/2014 | Hickford et al. |
| 2014/0201317 A1 | 7/2014 | Nerieri |
| 2014/0222930 A1 | 8/2014 | Gangadharan et al. |
| 2014/0297713 A1 | 10/2014 | Meigen et al. |
| 2014/0304700 A1 | 10/2014 | Kim et al. |
| 2014/0359619 A1 | 12/2014 | Park et al. |
| 2015/0089577 A1 | 3/2015 | Beckman et al. |
| 2015/0121375 A1 | 4/2015 | Balasubramanyam et al. |
| 2015/0135338 A1 | 5/2015 | Moskal |
| 2015/0143091 A1 | 5/2015 | Brace et al. |
| 2015/0261951 A1 | 9/2015 | Abuelsaad et al. |
| 2015/0271256 A1 | 9/2015 | Pathak et al. |
| 2015/0331722 A1 | 11/2015 | Magro et al. |
| 2016/0105392 A1 | 4/2016 | Thakkar et al. |
| 2016/0147558 A1 | 5/2016 | Gaponenko et al. |
| 2016/0301680 A1 | 10/2016 | Main et al. |
| 2016/0342453 A1 | 11/2016 | Khan et al. |
| 2016/0359955 A1 | 12/2016 | Gin et al. |
| 2016/0378518 A1 | 12/2016 | Antony et al. |
| 2016/0381080 A1 | 12/2016 | Reddem et al. |
| 2017/0046134 A1 | 2/2017 | Straub |
| 2017/0102925 A1 | 4/2017 | Ali et al. |
| 2017/0177171 A1* | 6/2017 | Won ..................... G06F 17/2235 |
| 2017/0255890 A1* | 9/2017 | Palavalli .......... G06Q 10/06315 |
| 2017/0272472 A1 | 9/2017 | Adhar |

OTHER PUBLICATIONS

Non-Final Office Action dated Jul. 19, 2018 for related U.S. Appl. No. 15/665,079.
Non-Final Office Action dated May 23, 2018 for related U.S. Appl. No. 15/173,577.
Non-Final Office Action dated May 31, 2018 for related U.S. Appl. No. 15/431,404.
Wikipedia. "Remote direct memory access". Mar. 20, 2015. 2 pages.
International Search Report and Written Opinion dated Sep. 8, 2016 for corresponding PCT Patent Application No. PCT/US16/35929, 10 pages.
Non-Final Office Action dated Jan. 31, 2018 for related U.S. Appl. No. 15/173,577.
Wikipedia. "LXC". Apr. 18, 2017. 3 pages.
Wikipedia. "HTML element". Apr. 10, 2017. 7 pages.
U.S. Appl. No. 15/431,404 filed Feb. 13, 2017, 71 pages.
U.S. Appl. No. 15/665,079 filed Jul. 31, 2017, 76 pages.
European Search Report dated May 9, 2018 for EP Application No. 16804612.6, 7 pages.
Merkel, D. "Docker: Lightweight Linux Containers for Consistent Development and Deployment". Mar. 2014. 16 pages.
Non-Final Office Action dated Jan. 9, 2019 for related U.S. Appl. No. 15/173,577, 10 pages.
Final Office Action dated Jan. 23, 2019 for related U.S. Appl. No. 15/665,079, 16 pages.
Pahl, Claus. "Containers and Clusters for Edge Cloud Architectures—a Technology Review". Oct. 26, 2015. 8 pages.
Rotter et al. "Using Linux Containers in Telecom Applications". Mar. 3, 2016. 8 pages.
Bernstein, David. "Containers and Cloud: From LXC to Docker to Kubernetes". IEEE Cloud Computing. Sep. 2014. 4 pages.
Gerlach et al. "Skyport—Container-Based Execution Environment Management for Multi-cloud Scientific Workflows". Nov. 2014. 9 pages.
Burns et al. "Design patterns for container-based distributed systems". HotCloud'16 Proceedings of the 8th USENIX Conference on Hot Topics in Cloud Computing. Jun. 12, 2016. 6 pages.
Marmol et al. "Networking in Containers and Container Clusters". Proceedings of netdev 0.1. Feb. 17, 2015. 4 pages.
Arnautov et al. "SCONE: Secure Linux Containers with Intel SGX". Nov. 4, 2016. 17 pages.
Burns et al. "Borg, Omega, and Kubernetes". ACM Queue, vol. 14 (2016), pp. 70-93.
Singh, Satnam. "Cluster-level Logging of Containers with Containers". ACM Queue, vol. 14, issue 3, Jun. 28, 2016. 24 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication late based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Non-Final Office Action dated Mar. 8, 2019 for related U.S. Appl. No. 15/674,923, 10 pages.
Final Office Action dated Sep. 24, 2018 for related U.S. Appl. No. 15/173,577, 16 pages.
Final Office Action dated Oct. 3, 2018 for related U.S. Appl. No. 15/431,404, 24 pages.
Non-Final Office Action dated Mar. 29, 2019 for related U.S. Appl. No. 15/620,486, 20 pages.
Non-Final Office Action dated Apr. 4, 2019 for related U.S. Appl. No. 15/431,404.
Srivastav, P. "What is Docker?" (Jan. 10, 2016) date identified by Google, from https://docker-curriculum.com/#give-feedback.
Evans, C. "Working With Containers #1: Getting Started with Docker" (Feb. 1, 2016) from https://blog.architecting.it/working-with-containers-1-getting-started-with-docker/.
Baldwin, M. "Configure a Docker Container to Automatically Pull From GitHub Using Oauth" (Feb. 19, 2015), from https://devops.ionos.com/tutorials/configure-a-docker-container-to-automatically-pull-from-github-using-oauth/.
Hall, S. "Supergiant Builds on Kubernetes to Manage Multitenancy for Distributed Applications" (Sep. 21, 2016), from https://thenewstack.io/supergiant-builds-kubernetes-manage-multi-tenancy-distributed-applications/.

(56) References Cited

OTHER PUBLICATIONS

Hom, C. "Kubernetes Cluster Federation: Efficiently deploy and manage applications across the globe" (Jul. 21, 2016), from https://coreos.com/blog/kubernetes-cluster-federation.html.

Sanchez, G. "Drive a full lifecycle with Jenkins + Kubernetes" (Oct. 20, 2016), from https://elasticbox.com/blog/.

StackPointCloud: "Node Autoscaling, Docker to Kubernetes Onboarding Tools & Production Fabric8 for Developers" (Oct. 27, 2016), from https://blog.stackpoint.io/node-autoscaling-docker-to-kubernetes-onboarding-tools-production-fabric8-for-developers-8e77a4a237b2.

Strachan, J. "the easiest way to get started with fabric8 on the public cloud is now StackPointCloud!" (Oct. 31, 2016), from https://blog.fabric8.io/the-easiest-way-to-get-started-with-fabric8-on-the-public-cloud-is-now-stackpointcloud-2f2083d9lbf4.

Tost et al. "Build and extend Docker container images with middleware functions" (Aug. 22, 2016), from https://developer.ibm.com/tutorials/mw-1608-tost-trs/.

Kumar et al. "Creating and Managing Docker VM Extensions in Azure" (Oct. 15, 2015), from https://www.red-gate.com/simple-talk/cloud/platform-as-a-service/creating-and-managing-docker-vm-extensions-in-azure/.

"Working with Docker" (Apr. 4, 2019), from https://code.visualstudio.com/docs/azure/docker.

Sullivan, A. "NetApp Persistent Storage in Kubernetes: Using ONTAP and NFS" (May 11, 2016), from https://netapp.io/2016/05/11/netapp-persistent-storage-kubernetes-using-ontap-nfs/.

Sullivan, A. "Are Docker Containers Right for Your Enterprise Applications?" (Apr. 19, 2016), from https://blog.netapp.com/blogs/are-docker-containers-right-for-your-enterprise-applications/.

Younes R. "Dockerizing a PHP Application" (Mar. 9, 2016), from https://semaphoreci.com/commumty/tutorials/dockerizing-a-php-application.

Final Office Action dated Jul. 5, 2019 for related U.S. Appl. No. 15/173,577.

Final Office Action dated Sep. 18, 2019 for related U.S. Appl. No. 15/674,923.

Final Office Action dated Oct. 10, 2019 for related U.S. Appl. No. 15/431,404.

Final Office Action dated Oct. 23, 2019 for related U.S. Appl. No. 15/173,577.

Cano, I. et al., "Curator: Self-Managing Storage for Enterprise Clusters", *14th USENIX Symposium on Networked Systems Design and Implementation, NSDI '17*, (Mar. 27, 2017).

Advisory Action dated Dec. 26, 2019 for related U.S. Appl. No. 15/431,404.

Notice of Allowance dated Mar. 6, 2020 for related U.S. Appl. No. 15/431,404.

Notice of Allowance dated Mar. 9, 2020 for related U.S. Appl. No. 15/173,577.

\* cited by examiner

CONTAINERIZED APPLICATION EXTENSIONS IN DISTRIBUTED STORAGE SYSTEMS

FIELD

This disclosure relates to distributed data storage, and more particularly to techniques for managing containerized application extensions in distributed virtualization systems.

BACKGROUND

The use of virtualized environments in distributed computing systems to improve the utilization of computing resources continues to increase. For example, virtual machines (VMs) and/or containerized applications (CAs) can be implemented in hypervisor-implemented virtualization environments and/or operating system virtualization environments in distributed computing systems. The high utility delivered by VMs and CAs has precipitated an increase in deployment of distributed storage systems. Specifically, such distributed storage systems can aggregate various physical storage facilities to create a logical storage pool where data may be efficiently distributed according to various metrics and/or objectives. Modern hyper-converged (e.g., combining networked computing and storage nodes into a distributed storage system) have evolved to comprise autonomous nodes that facilitate incremental and/or linear scaling. With certain clusters in a distributed system scaling to over one hundred nodes and supporting many thousands of autonomous VMs, the topology and/or the storage I/O (input/output or IO) activity of the distributed system can be highly dynamic. Users (e.g., system administrators) of such large scale, highly dynamic distributed systems desire applications (e.g., management tools) that facilitate managing and/or analyzing the distributed systems. Changes to the system topology and/or usage can, in turn, precipitate changes to the management and/or analysis functionality. For example, a given system administrator for an enterprise might hypothesize that a certain set of metrics are correlated to the performance of the enterprise's distributed compute and storage system implementation. Accordingly, the system administrator might seek an extension to the system management application that measures and analyzes the metrics.

Unfortunately, legacy techniques might merely extend application functionality in response to a user request (e.g., a feature request from a system administrator) by adding the functionality to an existing application. However, delivery of the application extension to the system administrator might be delayed during implementation, and perhaps still further delayed until release of a newer version of the existing application and/or a system upgrade. In such cases, the user experience may be negatively impacted by poor system performance and/or other negative effects due to the absence of, or delayed availability of, the sought-after application extension. Such legacy approaches can further degrade the user experience by limiting the system administrator to merely the application extensions explicitly requested (e.g., to a component vendor) by the system administrator. What is needed is a way that application extensions that are posted by users in a community can be quickly availed to system administrators of hyper-converged virtualization systems.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for managing containerized application extensions in distributed virtualization systems, which techniques advance the relevant technologies to address technological issues with legacy approaches. More specifically, the present disclosure provides a detailed description of techniques used in systems, methods, and in computer program products for managing containerized application extensions in distributed virtualization systems. Certain embodiments are directed to technological solutions for implementing system components and an interaction protocol in a distributed virtualization environment to manage containerized application extensions for efficiently extending the functionality and user experience available to users.

The disclosed embodiments modify and improve over legacy approaches. In particular, the herein-disclosed techniques provide technical solutions that address the technical problems attendant to efficiently extending the application functionality available to users of distributed virtualization systems. Such technical solutions relate to improvements in computer functionality. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of hyperconverged, high-performance computing as well as advances in various technical fields related to configuration of virtualized computing machines.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
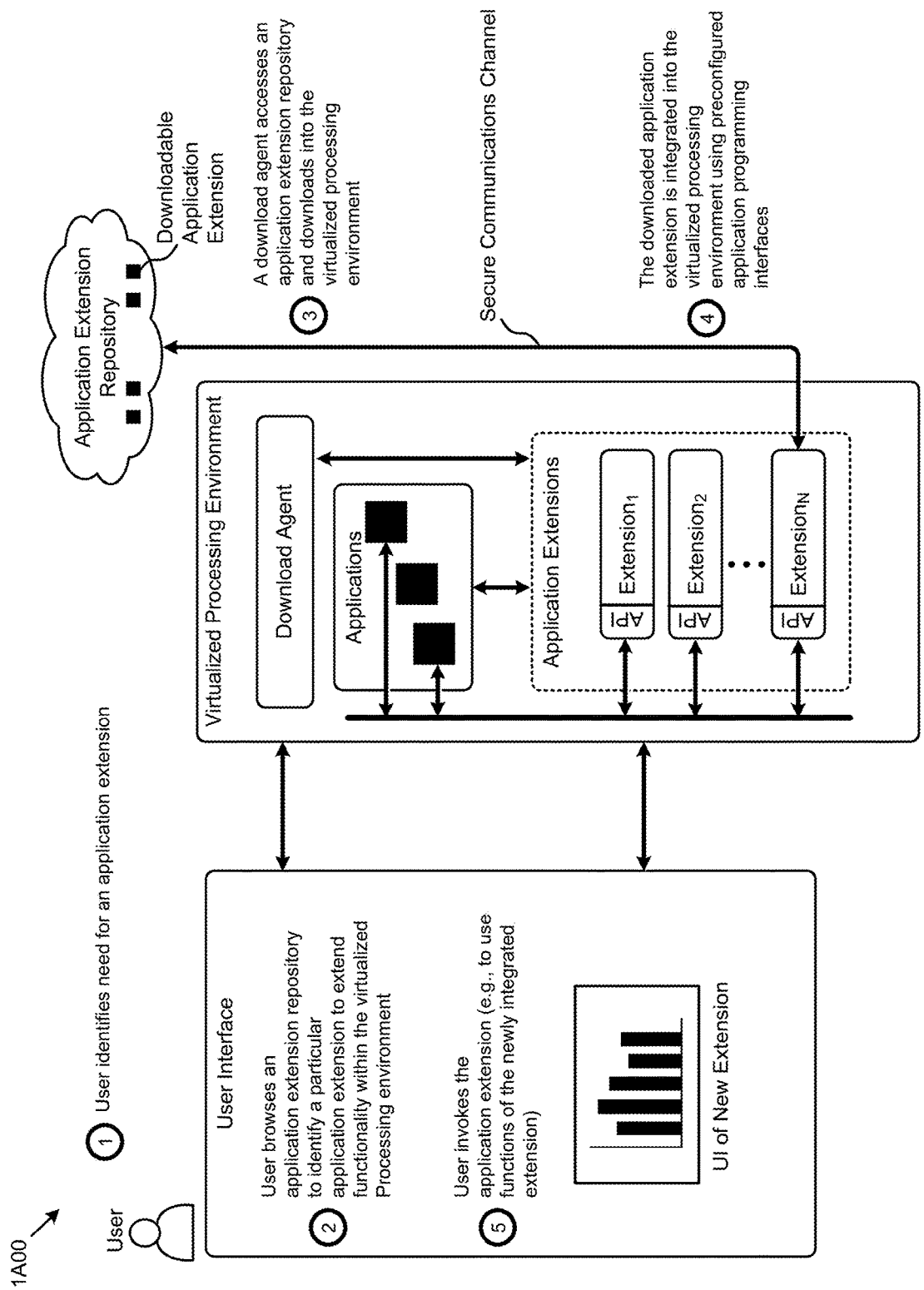
FIG. 1A illustrates an application extension installation technique as implemented in systems for managing containerized application extensions in distributed virtualization systems, according to an embodiment.

Some embodiments of the present disclosure address the problem of efficiently extending the application functionality available to users of distributed virtualization systems and some embodiments are directed to approaches for implementing system components and an interaction protocol in a distributed virtualization environment to manage containerized application extensions for efficiently extending the functionality and user experience available to users. The accompanying figures and discussions herein present example environments, systems, methods, and computer program products for managing containerized application extensions in distributed virtualization systems.

Overview

Disclosed herein are techniques for managing containerized application extensions so as to efficiently extend and/or enhance the functionality and user experience available to users of the distributed virtualization system. In certain embodiments, user commands are received from a user interface at a virtualized controller in the distributed virtualization environment to access a containerized application extension managed by a virtualized container service machine. The user commands invoke various operations pertaining to the containerized application extension such as starting the extension, stopping the extension, or deleting the extension. In some cases, a user command can invoke the discovery of the containerized application extension in a container repository for installation in the distributed virtualization environment. Certain operations might also facilitate the display of results generated by the containerized application extension in the user interface. In certain embodiments, the virtualized controller or any variants of virtualized container service machines are a virtual machines or a containers. In other embodiments, the containerized application extension comprises at least one API to communicate with the user interface, the virtualized controller, or a third-party resource.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates an application extension installation technique 1A00 as implemented in systems for managing containerized application extensions in distributed virtualization systems. As an option, one or more variations of application extension installation technique 1A00 or any aspect thereof may be implemented in the context of the architecture and functionality of the embodiments described herein. The application extension installation technique 1A00 or any aspect thereof may be implemented in any environment.

At step 1, a user identifies a need for an application extension to extend the capabilities afforded within the virtualized processing environment (e.g., by adding additional applications, or by adding extensions to existing applications). At step 2, the user browses an application extension repository to identify one or more applications or applications extensions that satisfy the identified need. Once identified, the user invokes operations of a download agent that downloads the identified application extension over secure communications (step 3). The downloaded application extension (e.g., extension, as shown) is integrated into the virtualized processing environment using application programming interfaces (APIs) that correspond to either a pre-determined API configuration, or that correspond to an API or set of APIs supported by any previously-installed applications or application extensions (step 4). Once so integrated, the functionality afforded by the downloaded application extension is offered to the user, who in turn can invoke functions of the newly-installed application. In some cases, and as shown, the functionality afforded by the downloaded application extension is visible in a user interface (step 5), possibly through screen devices (e.g., charts, reports) of the newly-integrated application extension. The foregoing steps can be repeated for other application extensions (e.g., extension$_1$, extension$_2$). In some cases, the application extensions are containerized, and thus do not rely on the presence of any particular underlying operating system or the presence of any particular virtualization environment.

Figure 1B:
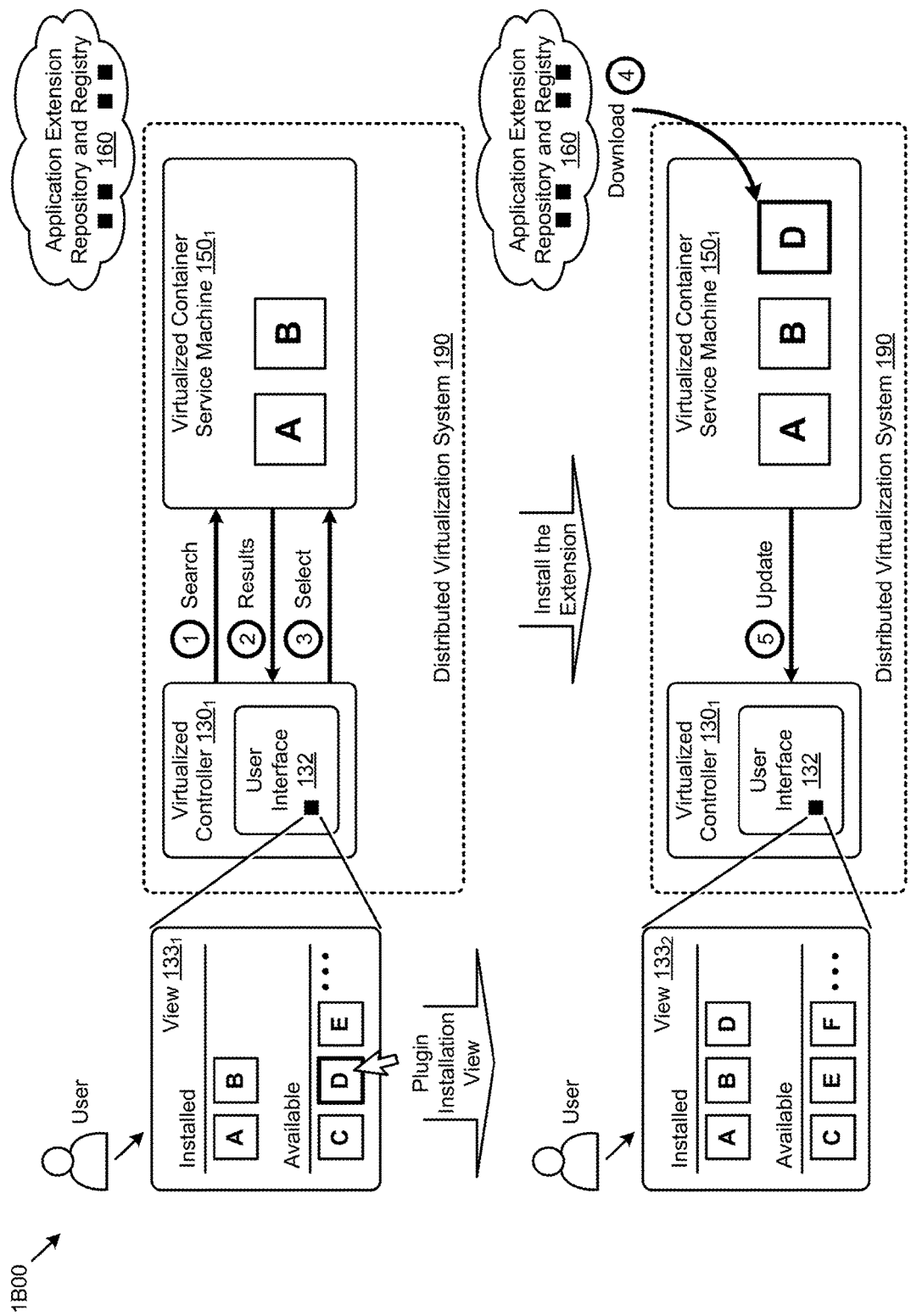
FIG. 1B illustrates an application extension installation technique as implemented in systems for managing containerized application extensions in distributed virtualization systems, according to an embodiment.

FIG. 1B illustrates an application extension installation technique 1B00 as implemented in systems for managing containerized application extensions in distributed virtualization systems. As an option, one or more variations of application extension installation technique 1B00 or any aspect thereof may be implemented in the context of the architecture and functionality of the embodiments described herein. The application extension installation technique 1B00 or any aspect thereof may be implemented in any environment.

Application extension installation technique 1B00 illustrated in FIG. 1B depicts a flow of operations pertaining to installing a containerized application extension in a distributed virtualization environment according to the herein disclosed techniques. The flow depicts steps of searching a repository, selecting from available downloadable application extensions, downloading selected ones, and using a container service machine to facilitate installation. Once installed, a user interface can present views so as to confirm to the user that the application extension has been successfully installed. As shown in this example, an installed application extension can be used in or with a virtualized controller that is used by virtualization systems to access a shared storage pool. Further details pertaining to virtualized controllers that access a shared storage pool are provided infra.

Strictly as one in situ example, the virtualized controllers and the virtualized container service machines depicted in FIG. 1B are merely representative instances of virtualized controllers and of virtualized container service machines that are used to facilitate the application extension installation technique 1B00 in a distributed virtualization system 190. In certain embodiments, virtualized controller 130$_1$ can also facilitate efficient use of resources (e.g., compute resources, storage resources, networking resources, etc.) in distributed virtualization system 190. Further, virtualized container service machine 150$_1$ can carry out various operations pertaining to containerized application extensions (e.g., extension A, extension B, etc.). As can be observed, a user can interact with a user interface 132 at the virtualized controller 130$_1$ to perform various activities associated with the containerized application extensions. For example, the user might search for the installed and/or available containerized application extensions (operation 1). In response, search results comprising the installed containerized application extensions installed in virtualized container service machine 150$_1$ (e.g., extension A and extension B) and the available containerized application extension images (e.g., extension C, extension D, extension E, etc.) in an application extension repository and registry 160 can be returned (operation 2). The returned results can trigger a refresh of the user interface 132 to display a view 133$_1$. The user might then select (operation 3) a containerized application extension (e.g., extension D) from the available extensions. The image associated with the selected containerized application extension is then downloaded from application extension repository and registry 160 (operation 4). Responsive to completion of the download, the downloaded application extension is installed in a virtualized container service machine 150$_1$. The newly-installed application extension is registered with a virtualized controller, which in turn provides an update to the user interface 132 (operation 5) so as to generate an updated instance of view 133$_2$.

Figure 1C:
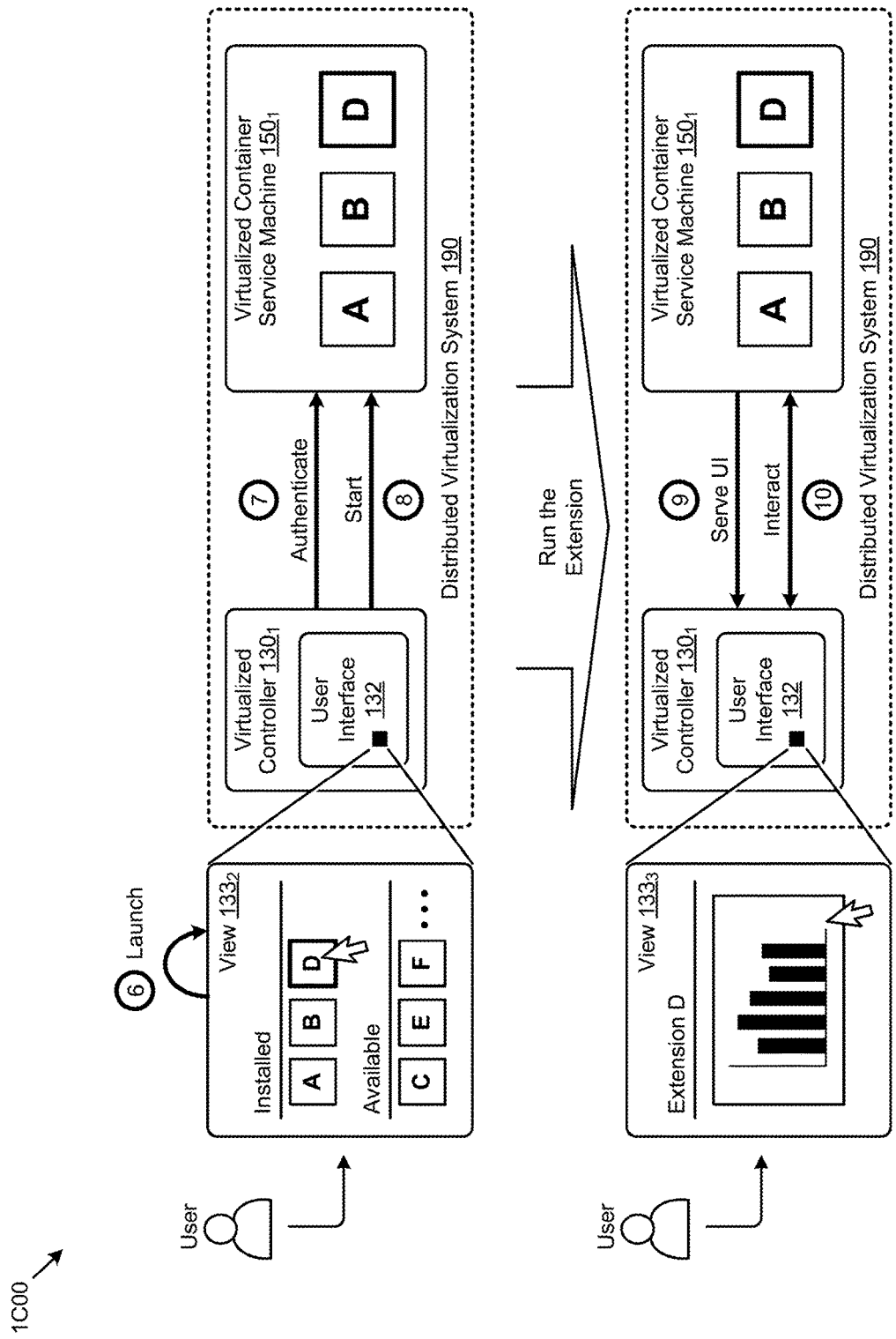
FIG. 1C illustrates an application extension usage technique as implemented in systems for managing containerized application extensions in distributed virtualization systems, according to an embodiment.

The newly installed containerized application extension (e.g., extension D) can be accessed by the user as shown and described as pertaining to FIG. 1C.

FIG. 1C illustrates an application extension usage technique 1C00 as implemented in systems for managing containerized application extensions in distributed virtualization systems. As an option, one or more variations of application extension usage technique 1C00 or any aspect thereof may be implemented in the context of the architecture and functionality of the embodiments described herein. The application extension usage technique 1C00 or any aspect thereof may be implemented in any environment.

Application extension usage technique 1C00 illustrated in FIG. 1C depicts a flow of operations pertaining to using a containerized application extension in a distributed virtualization environment according to the herein disclosed techniques. Shown is virtualized controller 130$_1$ and virtualized container service machine 150$_1$ in distributed virtualization system 190 as earlier shown and described as pertains to FIG. 1B. A user can interact with user interface 132 at virtualized controller 130$_1$ to launch one of the installed containerized application extensions (operation 6). For example, the user can click on the "D" icon (e.g., for extension D) in the view 133$_2$ presented by user interface 132. Responsive to the user clicking the icon, virtualized controller 130$_1$ can receive and authenticate the request for an instance of a containerized application extension (operation 7). The virtualized controller can start an instance of the container associated with the selected application extension (operation 8). According to the herein disclosed techniques, the now running containerized application extension can service certain events and/or can deliver display information (e.g., HTML) to the user interface 132 (operation 9). For example, such information might generate a view 133$_3$ in the user interface. The user, possibly through user interface 132, can continue to interact (operation 10) with the containerized application extension running in virtualized container service machine 150$_1$.

Figure 1D:
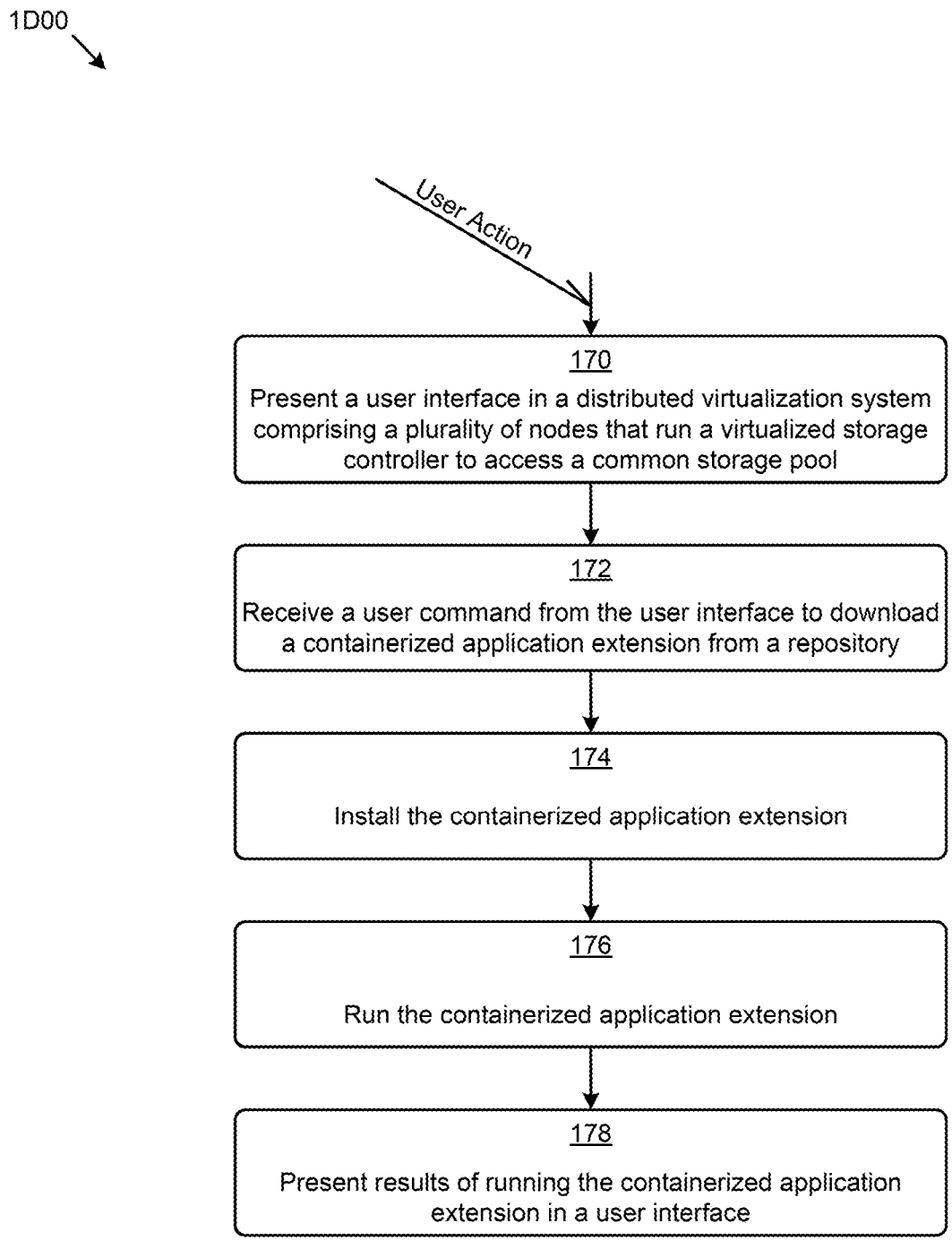
FIG. 1D is a flowchart depicting user interactions to manage containerized application extensions in distributed virtualization systems, according to an embodiment.

Further details describing use cases for interaction (e.g., using user interface 132) when managing containerized application extensions are given in FIG. 1D.

FIG. 1D is a flowchart 1D00 depicting user interactions to manage containerized application extensions in distributed virtualization systems. As shown, a distributed virtualization system comprising virtualized storage controllers is configured to include a user interface (step 170). Users interact with the user interface to download components from a containerized application extension repository (step 172). The interactions with the user interface might include user commands and/or authorizations to install the containerized application extension into the distributed virtualization system (step 174). Once installed, the containerized application extension can be invoked (step 176). Operation of the invoked containerized application extension can produce displayable results. In such cases, displayable results that are emitted by the containerized application extension can be presented in a user interface (step 178).

Figure 1E:
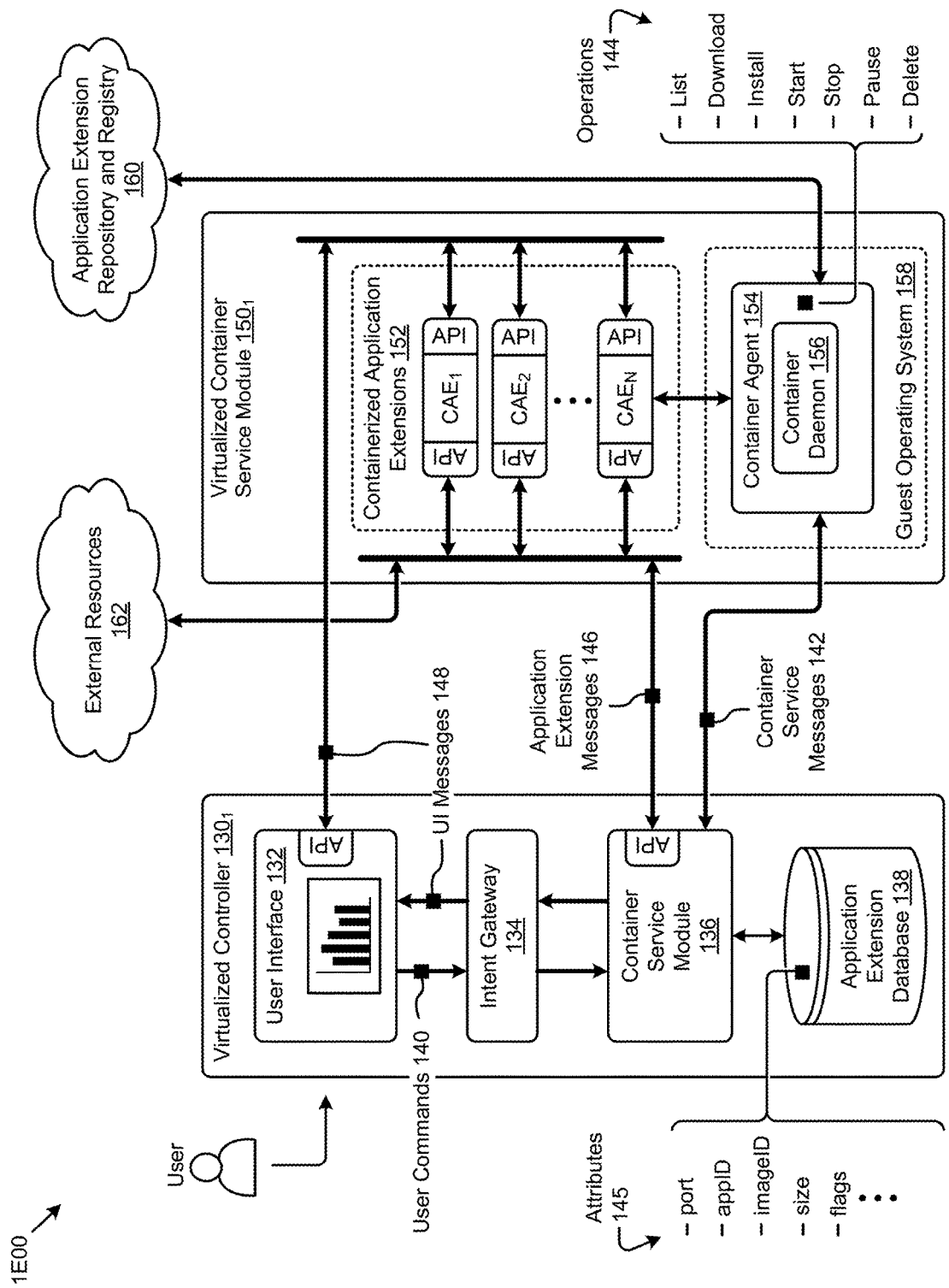
FIG. 1E is a block diagram of a container support system used for managing containerized application extensions in distributed virtualization systems, according to an embodiment.

FIG. 1E is a block diagram 1E00 of a container support system used for managing containerized application extensions in distributed virtualization systems. As an option, one or more variations of block diagram 1E00 or any aspect thereof may be implemented in the context of the architecture and functionality of the embodiments described herein. The block diagram 1E00 or any aspect thereof may be implemented in any environment.

As shown, a virtualized controller $130_1$ in the container support system includes a user interface 132 (UI) that provides a man-machine interface that can comprise a graphical user interface (GUI) and/or a command line interface (CLI) that facilitates interactions with a user. More particularly, user interface 132 permits a user to interact with various modules of the container support system so as to publish, select, install, and deploy containerized application extensions in a distributed virtualization environment according to the herein disclosed techniques. Specifically, the user can interact with the GUI and/or CLI to issue a set of user commands 140 to carry out various operations (e.g., operations 144) in a virtualized container service machine $150_1$ comprising a set of containerized application extensions 152. As shown, user commands 140 can be passed through an intent gateway 134 that can analyze the commands to determine the intent of the user as indicated by certain aspects of the commands. For example, intent gateway 134 can determine the "kind" of containerized application extension pertaining to user commands 140 that were issued by the user. A particular "kind" corresponds to, for example, a respective set of configuration parameters and/or configuration sequences associated with a given container (e.g., containerized application extension). Other aspects of user commands 140 can indicate one or more operations pertaining to the containerized application extensions requested by the user.

In some embodiments and as shown, communication of one or more instances of container service messages 142 (e.g., derived from user commands 140) between virtualized controller $130_1$ and virtualized container service machine $150_1$ can be facilitated by an application extension service module 136 at the virtualized controller $130_1$ and a container agent 154 at the virtualized container service machine $150_1$. Strictly as an example, communications between application extension service module 136 and container agent 154 can rely on inter-process communications (IPC), sockets, REST APIs, data messages passing through shared memory, IP protocols, tunnels, and/or other communication methods.

Application extension service module 136 can also perform certain management operations pertaining to the containerized application extensions associated with the distributed virtualization environment. For example, application extension service module 136 maintains an application extension database 138 that records the available containerized application extensions (e.g., containerized application extensions 152). For example, application extension database 138 can record a set of attributes 145 associated with each containerized application extension, such as a containerized application extension identifier or "caeID", an extension "port", an underlying application identifier or "appID", an image identifier or "imageID", an extension "size" (e.g., in MB), and/or other attributes. Application extension database 138 can also include "flags" associated with the containerized application extensions to indicate various lifecycle attributes (e.g., available, downloaded, installed, running, paused, restricted, obsolete, pending deletion, etc.), and/or other attributes.

The application extension service module 136 can further manage the distribution of the containerized application extensions among instances of virtualized container service machines throughout the distributed system. In some cases, application extension service module 136 can invoke operations to create and/or delete one or more virtualized container service machines. For example, such scaling of virtualized container service machines might be based at least in part on the CPU and/or memory resources required by the containerized application extensions running and/or installed in the distributed virtualization system.

As earlier mentioned, container agent 154 at the virtualized container service machine $150_1$ can facilitate direct communications with application extension service module 136 to perform various operations (e.g., operations 144) pertaining to containerized application extensions. Specifically, one or more instances of container service messages 142 from application extension service module 136 to container agent 154 might request a "list" of containerized application extensions, or invoke a "download" of one or more containerized application extension images from an application extension repository and registry 160 (e.g., Docker Hub). Such repositories and/or registries can be public or private. The container service messages 142 might also invoke an "install" operation, a "start" operation, a "stop" operation, a "pause" operation, or a "delete" operation pertaining to one or more containerized application extensions. Other operations are possible.

In certain embodiments, container agent 154 can comprise a container daemon 156 that facilitates the execution of the foregoing operations. Container daemon 156 can also facilitate communication with application extension repository and registry 160. Container daemon 156 (e.g., Docker daemon) can further serve to facilitate running the containerized application extensions (e.g., $CAE_1$, $CAE_2$, . . . , $CAE_N$) installed in virtualized container service machine $150_1$. In some embodiments, virtualized container service machine $150_1$ can be a virtual machine running on a guest operating system 158, where container agent 154 comprises the guest operating system (e.g., Linux OS) or is part of the guest operating system, and container daemon 156 is running in the guest operating system.

As can be observed, containerized application extensions (e.g., $CAE_1$, $CAE_2$, . . . , $CAE_N$) installed in virtualized container service machine $150_1$ can have various application programming interfaces (APIs) to communicate with components in the distributed virtualized system. Specifically, the containerized application extensions can have an API (e.g., REST API) that receives the application extension messages 146 from a corresponding API at application extension service module 136. For example, application extension messages 146 might correspond to instances of user commands 140 issued from user interface 132 to interact with a specific containerized application extension. The addressed containerized application extension can respond through another API to deliver UI messages 148 (e.g., JSON messages comprising HTML5, CSS, JS, etc.) to user interface 132. In some cases, responses from a containerized application extension can be delivered as instances of application extension messages 146 through application extension service module 136 to user interface 132. As further shown, a set of external resources 162 (e.g., third-party data providers) can communicate with the containerized application extensions 152 through a receiving API.

Further details regarding general approaches to container support architectures in virtualization environments are described in U.S. application Ser. No. 15/173,577 titled, "ARCHITECTURE FOR MANAGING I/O AND STORAGE FOR A VIRTUALIZATION ENVIRONMENT USING EXECUTABLE CONTAINERS AND VIRTUAL MACHINES" filed on Jun. 3, 2016, which is hereby incorporated by reference in its entirety.

The container support system shown in FIG. 1E presents merely one partitioning and virtualization approach. The specific example shown is merely illustrative, and other subsystems and/or partitionings and/or virtualization approaches are reasonable. One embodiment of an environment depicting such systems, subsystems, partitionings, and/or virtualization approaches is shown and described as pertaining to FIG. 2.

Figure 2:
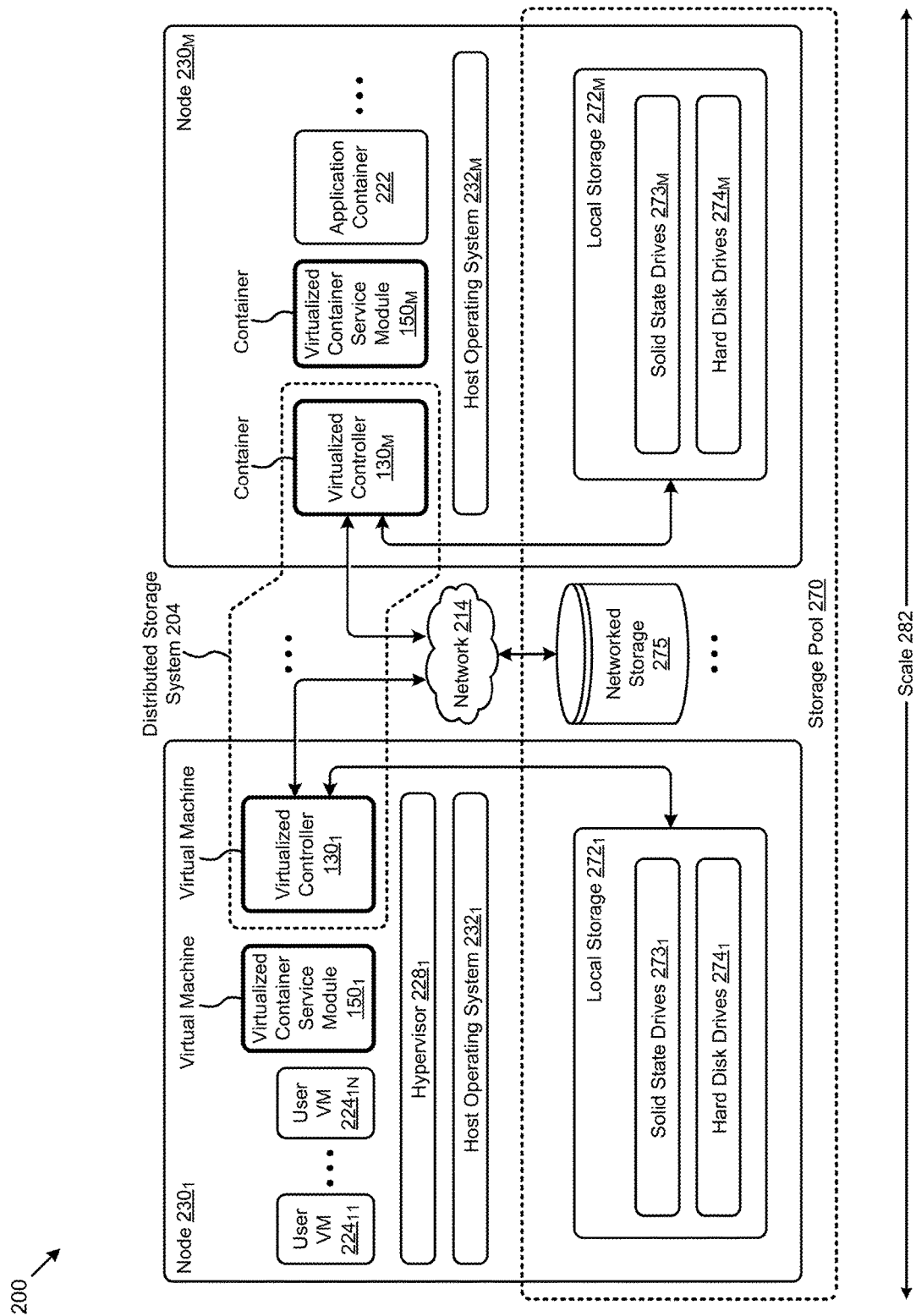
FIG. 2 depicts a distributed virtualization environment in which embodiments of the present disclosure can operate.

FIG. 2 depicts a distributed virtualization environment 200 in which embodiments of the present disclosure can operate. As an option, one or more variations of distributed virtualization environment 200 or any aspect thereof may be implemented in the context of the architecture and functionality of the embodiments described herein.

The distributed virtualization environment 200 shows various components associated with one instance of a distributed virtualization system (e.g., hyperconverged distributed system) comprising a distributed storage system 204 that can be used to implement the herein disclosed techniques. Specifically, the distributed virtualization environment 200 comprises multiple nodes (e.g., node $230_1, \ldots$, node $230_M$) that have multiple tiers of storage in a storage pool 270. For example, each node can be associated with one server, multiple servers, or portions of a server. A group of such nodes can be called a cluster. As shown, the multiple tiers of storage include storage that is accessible through the network 214, such as a networked storage 275 (e.g., a storage area network or SAN, network attached storage or NAS, etc.).

The multiple tiers of storage further include instances of local storage (e.g., local storage $272_1, \ldots$, local storage $272_M$). For example, the local storage can be within or directly attached to a server and/or appliance associated with the nodes. Such local storage can include solid state drives (SSD $273_1, \ldots$, SSD $273_M$), hard disk drives (HDD $274_1, \ldots$, HDD $274_M$), and/or other storage devices. Specifically, the SSD storage might store instances of distributed metadata used in managing the distributed storage system 204.

As shown, the nodes in distributed virtualization environment 200 can implement one or more user virtual machines (e.g., user VM $224_{11}, \ldots$, user VM $224_{1N}$) and/or application containers (e.g., application container 222, etc.). The user VMs can be characterized as software-based computing "machines" implemented in a hypervisor-implemented virtualization environment that emulates the underlying hardware resources (e.g., CPU, memory, etc.) of the nodes. For example, multiple user VMs can operate on one physical machine (e.g., a node) running a single host operating system (e.g., host operating system $232_1, \ldots$, host operating system $232_M$), while the user VMs run multiple applications on various respective guest operating systems. Such flexibility can be facilitated at least in part by a hypervisor (e.g., hypervisor $228_1$), which hypervisor is logically located between the various guest operating systems of the user VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the application containers are implemented at the nodes in an operating system virtualization or container virtualization environment. The application containers comprise groups of processes and/or resources (e.g., memory, CPU, disk, etc.) that are isolated from the node host computer and other containers. Such containers directly interface with the kernel of the host operating system with, in most cases, no hypervisor layer. This lightweight implementation can facilitate efficient distribution of certain software components, such as applications or services (e.g., micro-services). As shown, distributed virtualization environment 200 can implement both a hypervisor-implemented virtualization environment and a container virtualization environment for various purposes. In some cases, multiple virtualization environments (e.g., hypervisor-implemented virtualization and operating system virtualization) can be implemented in a given node.

Distributed virtualization environment 200 also comprises at least one instance of a virtualized controller to facilitate access to storage pool 270 by the user VMs, the application containers, and/or other components of the distributed system. Multiple instances of such virtualized controllers can coordinate within a cluster to form the distributed storage system 204 which can, among other operations, manage the storage pool 270 and/or other resources in the system. This architecture further facilitates efficient scaling of the distributed virtualization system (e.g., see scale 282).

The foregoing virtualized controllers can be implemented in distributed virtualization environment 200 using various techniques. Specifically, an instance of a virtual machine at a given node can be used as a virtualized controller in a hypervisor-implemented virtualization environment to manage storage resources and I/O activities. In this case, for example, the user VMs at node $230_1$ can interface with virtualized controller $130_1$ implemented as a virtual machine through hypervisor $228_1$ to access the storage pool 270. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 204. For example, a hypervisor at one node in the distributed storage system 204 might correspond to VMware ESXi software, and a hypervisor at another node in the distributed storage system 204 might correspond to Nutanix AHV software. As another virtualized controller implementation example, containers (e.g., Docker containers) can be used to implement a virtualized controller (e.g., virtualized controller $130_M$) in an operating system virtualization environment at a given node. In this case, for example, the user VMs at node $230_M$ can access the storage pool 270 by interfacing with a controller container (e.g., virtualized controller $130_M$) through a hypervisor at node $230_M$ and/or the kernel of host operating system $232_M$.

In certain embodiments, one or more instances of a virtualized container service machine can be implemented in distributed virtualization environment 200 to facilitate the herein disclosed techniques. Specifically, virtualized container service machine $150_1$ can be implemented at node $230_1$, and virtualized container service machine $150_M$ can be implemented at node $230_M$. As shown, virtualized container service machine $150_1$ can be implemented as a virtual machine in a hypervisor-implemented virtualization environment, while virtualized container service machine $150_M$ can be implemented as a container in an operating system virtualization environment. Such instances of the virtualized container service machine can be implemented in any node in any cluster. In some cases, multiple instances of the virtualized container service machine can be created to carry out various operations pertaining to managing containerized application extensions according the herein disclosed techniques. One such example and embodiment of such containerized application extensions is shown and described as pertaining to FIG. 3.

Figure 3:
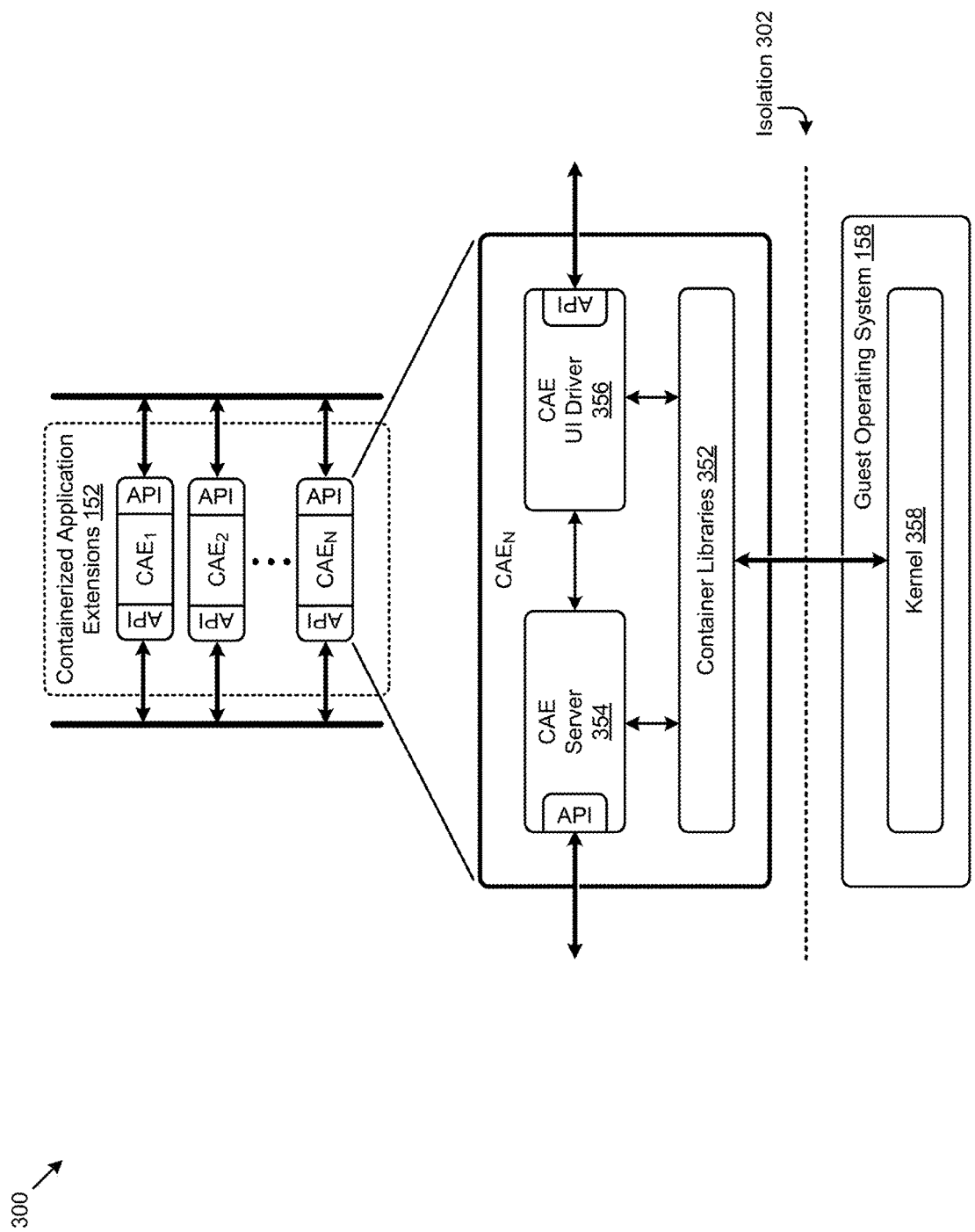
FIG. 3 presents a diagram of a containerized application extension architecture as implemented in systems for managing containerized application extensions in distributed virtualization systems, according to an embodiment.

FIG. 3 presents a diagram of a containerized application extension architecture 300 as implemented in systems for managing containerized application extensions in distributed virtualization systems. As an option, one or more variations of containerized application extension architecture 300 or any aspect thereof may be implemented in the context of the architecture and functionality of the embodiments described herein. The containerized application extension architecture 300 or any aspect thereof may be implemented in any environment.

FIG. 3 depicts certain details pertaining to one of the containerized application extensions (e.g., $CAE_N$) from containerized application extensions 152 earlier shown and described in FIG. 1E. Specifically, $CAE_N$ can comprise a containerized application extension server (e.g., CAE server 354), a containerized application extension user interface driver (e.g., CAE UI driver 356), and a set of container libraries 352. Each of CAE server 354 and CAE UI driver 356 can be developed (e.g., using a software developer kit or SDK) to carry out certain functions corresponding to the purpose of the application extension. For example, $CAE_N$ might be developed to monitor certain system performance metrics and graphically display the metrics in a user interface. In this case, CAE server 354 can collect the metric measurements to determine analysis results, while CAE UI driver 356 can generate the information (e.g., HTML5) used to display the results. APIs defined (e.g., in the SDK) for CAE server 354 and CAE UI driver 356 can be implemented to communicate with other components (e.g., container service, user interface, etc.) as implemented in systems that facilitate the herein disclosed techniques.

The container libraries 352 included in the containerized application extensions can provide a framework (e.g., format, template, wrapper, etc.) to facilitate operation of the extension in a given operating system, such as guest operating system 158. Specifically, container libraries 352 can comprise various structures (e.g., namespaces, control groups, file systems, etc.) that permit the containerized application extensions to run using the kernel 358 of the guest operating system 158, while providing a layer of isolation 302 from the operating system. Such container libraries can be provided in the SDKs to facilitate implementation of the containerized application extensions in various operating systems (e.g., Red Hat Enterprise Linux OS, Microsoft Windows Server OS, CentOS OS, etc.). The SDKs can further support multiple programming languages (e.g., Node.js, Java, Python, etc.).

Figure 4A:
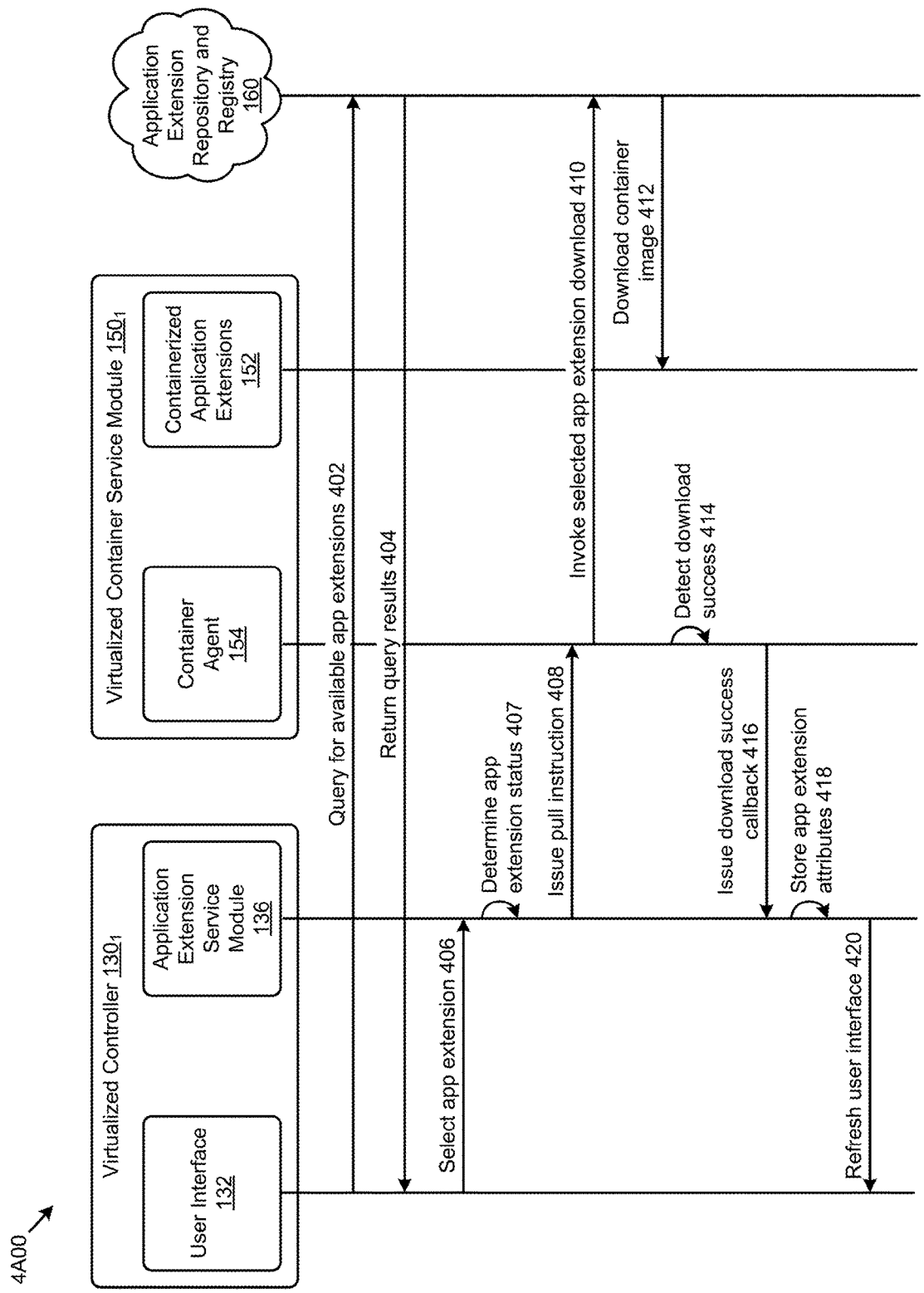
FIG. 4A is a protocol diagram showing system component interactions that facilitate an application extension installation as implemented in systems for managing containerized application extensions in distributed virtualization systems, according to an embodiment.
Figure 4B:
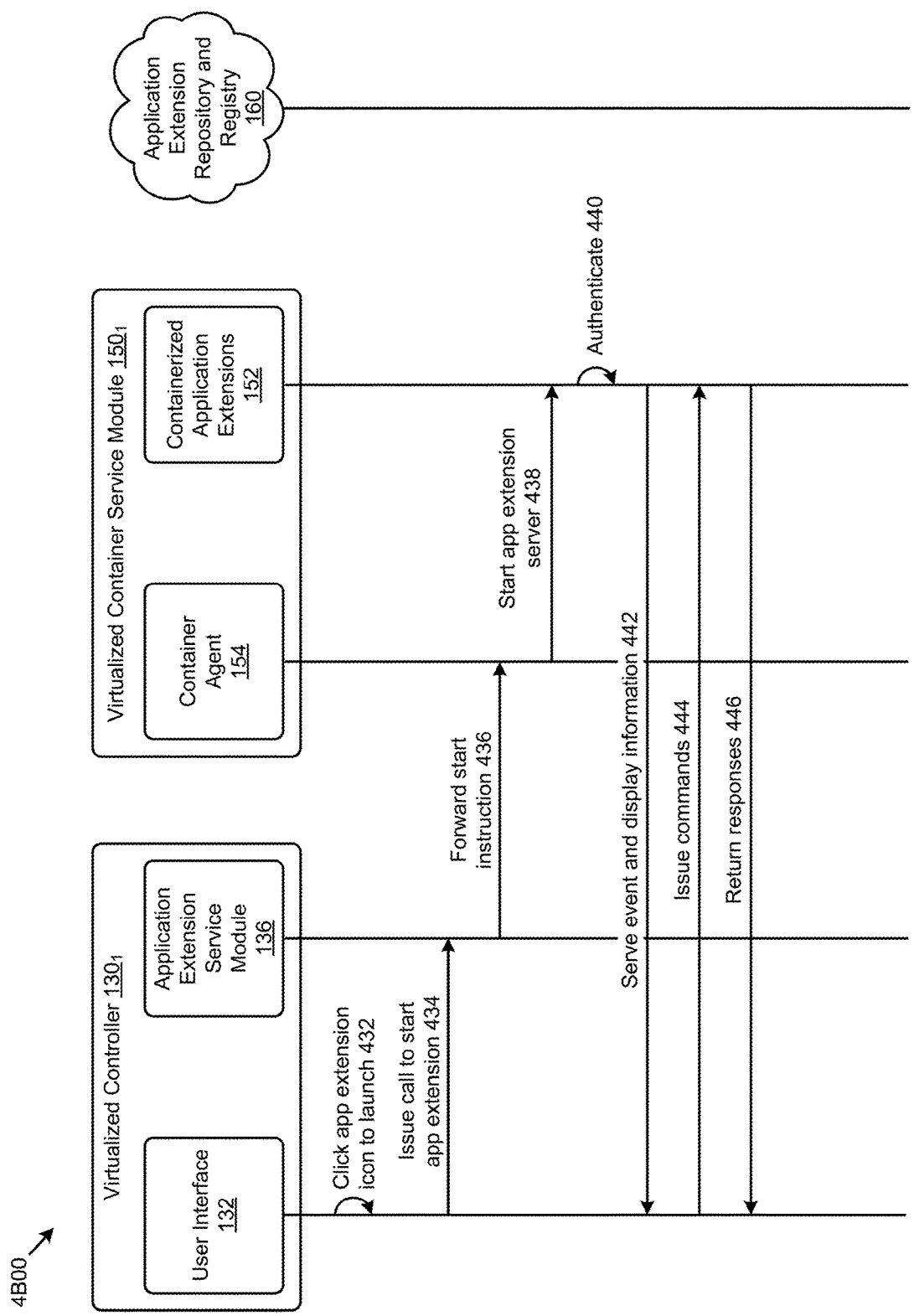
FIG. 4B is a protocol diagram showing system component interactions that facilitate application extension usage as implemented in systems for managing containerized application extensions in distributed virtualization systems, according to an embodiment.

Example embodiments of system component interactions facilitated by the herein disclosed techniques are shown and described as pertaining to FIG. 4A and FIG. 4B.

FIG. 4A is a protocol diagram 4A00 showing system component interactions that facilitate an application extension installation as implemented in systems for managing containerized application extensions in distributed virtualization systems. As an option, one or more variations of protocol diagram 4A00 or any aspect thereof may be implemented in the context of the architecture and functionality of the embodiments described herein. The protocol diagram 4A00 or any aspect thereof may be implemented in any environment.

Protocol diagram 4A00 presents various distributed virtualization system components earlier described that can exhibit a set of high order interactions (e.g., operations, messages, etc.) to facilitate the herein disclosed techniques, such as an application extension installation. Specifically shown are virtualized controller $130_1$ comprising user interface 132 and application extension service module 136, virtualized container service machine $150_1$ comprising container agent 154 and containerized application extensions 152, and application extension repository and registry 160.

As shown, a query to discover the available application extensions (e.g., app extensions) at the application extension repository and registry can be issued from the user interface (message 402). The query results can be returned for presentation at the user interface (message 404). One or more app extensions can be selected from the results at the user interface (message 406). For example, such selection might deliver to the application extension service module 136 certain attributes pertaining to the selected app extension, such as an underlying application identifier or an app extension identifier. Responsive to the selection, the container service machine can determine the status of the selected app extension (operation 407). For example, the container service machine might check an application extension database to determine if the selected app extension is installed, available but not installed, or of some other status. If the selected app extension is not installed, the container service machine can issue an instruction to the container agent to pull the selected app extension from the repository (message 408). For example, the instruction might comprise the foregoing app extension attributes with a directive or operation (e.g., "install"). The container agent can communicate with the repository to invoke a download of the selected app extension (message 410). The download of the image pertaining to the selected containerized application extension (message 412) can be detected at the container agent (operation 414) to issue a download success callback to the container service machine (message 416). Various attributes corresponding to the newly installed app extension can be saved (operation 418), and the user interface can be refreshed to, for example, indicate the app extension is installed and available (message 420).

FIG. 4B is a protocol diagram 4B00 showing system component interactions that facilitate application extension usage as implemented in systems for managing containerized application extensions in distributed virtualization systems. As an option, one or more variations of protocol diagram 4B00 or any aspect thereof may be implemented in the context of the architecture and functionality of the embodiments described herein. The protocol diagram 4B00 or any aspect thereof may be implemented in any environment.

FIG. 4B presents various distributed virtualization system components earlier described that can exhibit a set of high order interactions (e.g., operations, messages, etc.) to facilitate the herein disclosed techniques, such as pertaining to usage of containerized application extensions. Specifically shown are virtualized controller $130_1$ comprising user interface 132 and application extension service module 136, virtualized container service machine 150₁ comprising container agent 154 and containerized application extensions 152, and application extension repository and registry 160.

As shown, a user at the user interface can click an icon associated with a given containerized app extension (operation 432). This action can result in a call being issued to the container service machine to start the app extension (message 434). The call and/or instruction can be forwarded by the container service machine to the container agent (message 436) to start the server of the app extension (message 438). If the app extension is already running, the forwarded instruction can serve to provision access to the app extension by the requesting user. Specifically, the app extension server can authenticate the start request by, for example, verifying an authentication token passed to the server from the container agent (operation 440). Strictly as one example, authentication can include use of authentication standards such as OAUTH2 or other single- or multi-factor authentication techniques. The credentials and/or other forms of secrets that might be used in authentication can be stored in the CAE and/or the application extension database.

Upon start of the app extension server, a port and/or container identifier associated with the app extension can be established. This information, and/or other information such as event and display information, can be served from the app extension to the user interface (message 442). The user interface can then issue commands to the app extension (message 444) and receive responses from the app extension (message 446). For example, such communication with the containerized application extension can be facilitated by various APIs provided in respective SDKs as earlier described.

Additional Embodiments of the Disclosure

Additional Practical Application Examples

Figure 5:
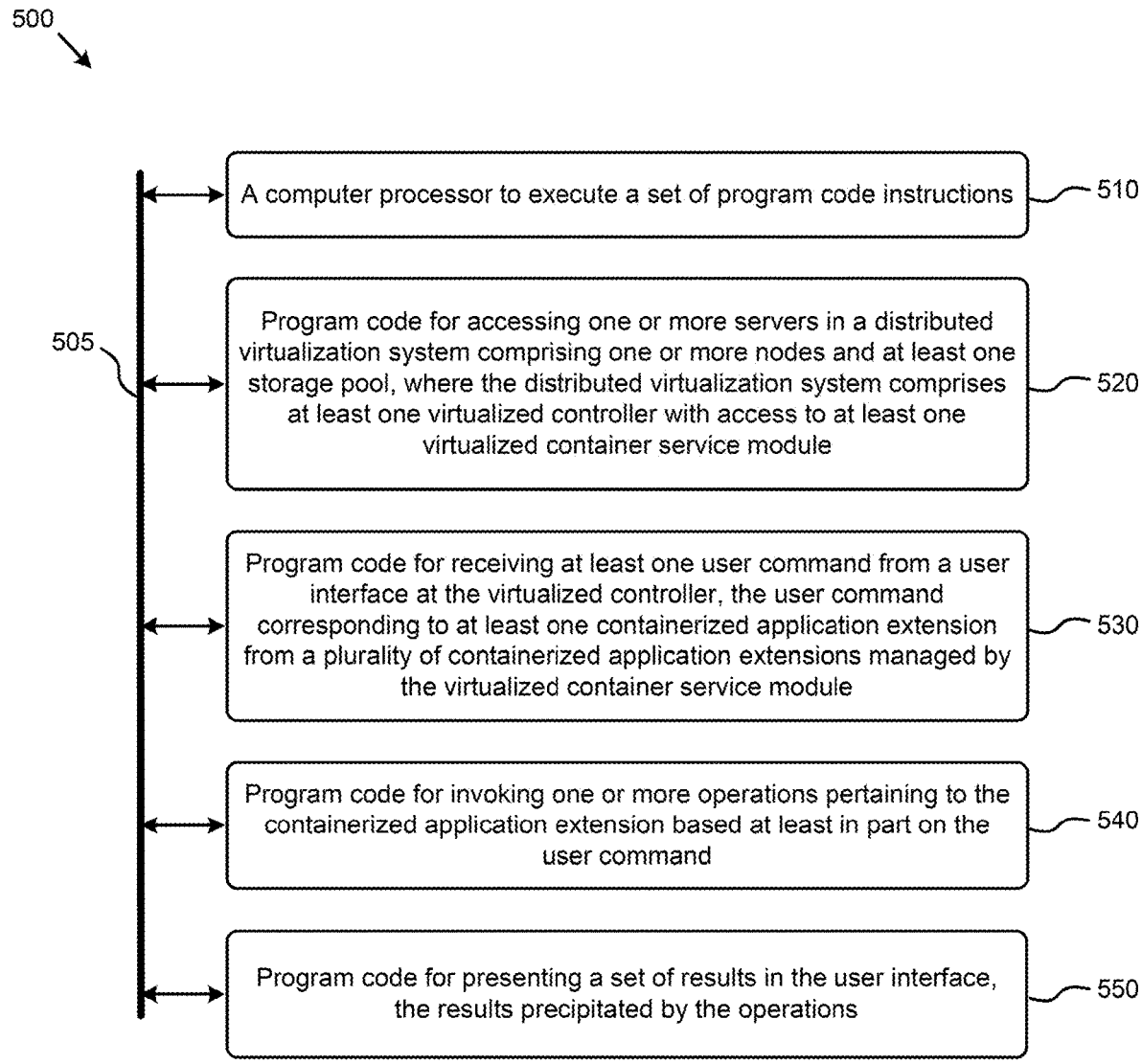
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. The partitioning of system 500 is merely illustrative and other partitions are possible. As an option, the system 500 may be implemented in the context of the architecture and functionality of the embodiments described herein. Of course, however, the system 500 or any operation therein may be carried out in any desired environment.

The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The shown embodiment implements a portion of a computer system, presented as system 500, comprising a computer processor to execute a set of program code instructions (module 510) and modules for accessing memory to hold program code instructions to perform: accessing one or more servers in a distributed virtualization system comprising one or more nodes and at least one storage pool, where the distributed virtualization system comprises at least one virtualized controller with access to at least one virtualized container service machine (module 520); receiving at least one user command from a user interface at the virtualized controller, the user command corresponding to at least one containerized application extension from a plurality of containerized application extensions managed by the virtualized container service machine (module 530); invoking one or more operations pertaining to the containerized application extension based at least in part on the user command (module 540); and presenting a set of results in the user interface, the results precipitated by the operations (module 550).

Variations of the foregoing may include more or fewer of the shown modules, and variations may perform more or fewer (or different) steps, and/or may use data elements in more, or in fewer (or different) operations.

Some variations further comprise downloading the containerized application extension from a container repository.

Some variations further comprise creating the virtualized container service machine responsive to receiving the user command.

Some embodiments include variations where operations pertaining to the containerized application extension are facilitated at least in part by a container daemon at the virtualized container service machine.

Some embodiments include variations where sets of attributes describing the plurality of containerized application extensions managed by the virtualized container service machine are stored in an application extension database.

Some embodiments include variations where the containerized application extension comprises at least one API, the API facilitating communication with at least one of, the user interface, the virtualized controller, or a set of external resources.

Some embodiments include variations where the containerized application extension comprises at least one of, a containerized application extension server, a containerized application extension user interface driver, or a set of container libraries.

Some embodiments include variations where invoking the operations comprises starting the containerized application extension server in the containerized application extension.

Some embodiments include variations where at least one of, the virtualized controller, or the virtualized container service machine, is at least one of, a virtual machine, or a container.

Some embodiments include variations where the virtualized container service machine is implemented in at least one of, the distributed virtualization system, or one or more bare metal servers.

Some embodiments include variations where the operations comprise at least one of, a list operation, a download operation, an install operation, a start operation, a stop operation, a pause operation, or a delete operation.

System Architecture Overview

Additional System Architecture Examples

The disclosed embodiments can be implemented in accordance with various architectures. In particular, some architectures can be characterized as distributed systems, having functional units that are hosted on network-connected devices that communicate and coordinate actions using messages. Distributed systems often operate to pursue a certain goal, such as efficient use of shared resources or such as concentration of storage I/O. For example, a first set of components in a distributed computing system can coordinate to efficiently use a set of computational or compute resources, while other components in the distributed storage system coordinate to efficiently use a shared data storage facility.

A hyper-converged system coordinates the efficient use of computing and storage resources that are integrated for high-performance cooperation. The components of any of the foregoing distributed system architectures can comprise physically distributed autonomous entities (e.g., multiple nodes of a cluster). Some of the foregoing distributed system architectures comprise logically distributed autonomous entities (e.g., virtual machines running on a node). A hyper-converged cluster can comprise a group (e.g., an array) of physical computing nodes. Some systems and/or environments might be characterized as implementing certain aspects of virtualization. In a hypervisor-implemented virtualization environment, autonomous entities of a distributed system can be implemented as virtual machines running over a hypervisor. In an operating system virtualization environment, the autonomous entities of a distributed system can be implemented as containers. In some systems and/or environments, hypervisor-implemented virtualization and operating system virtualization can be combined.

Figure 6A:
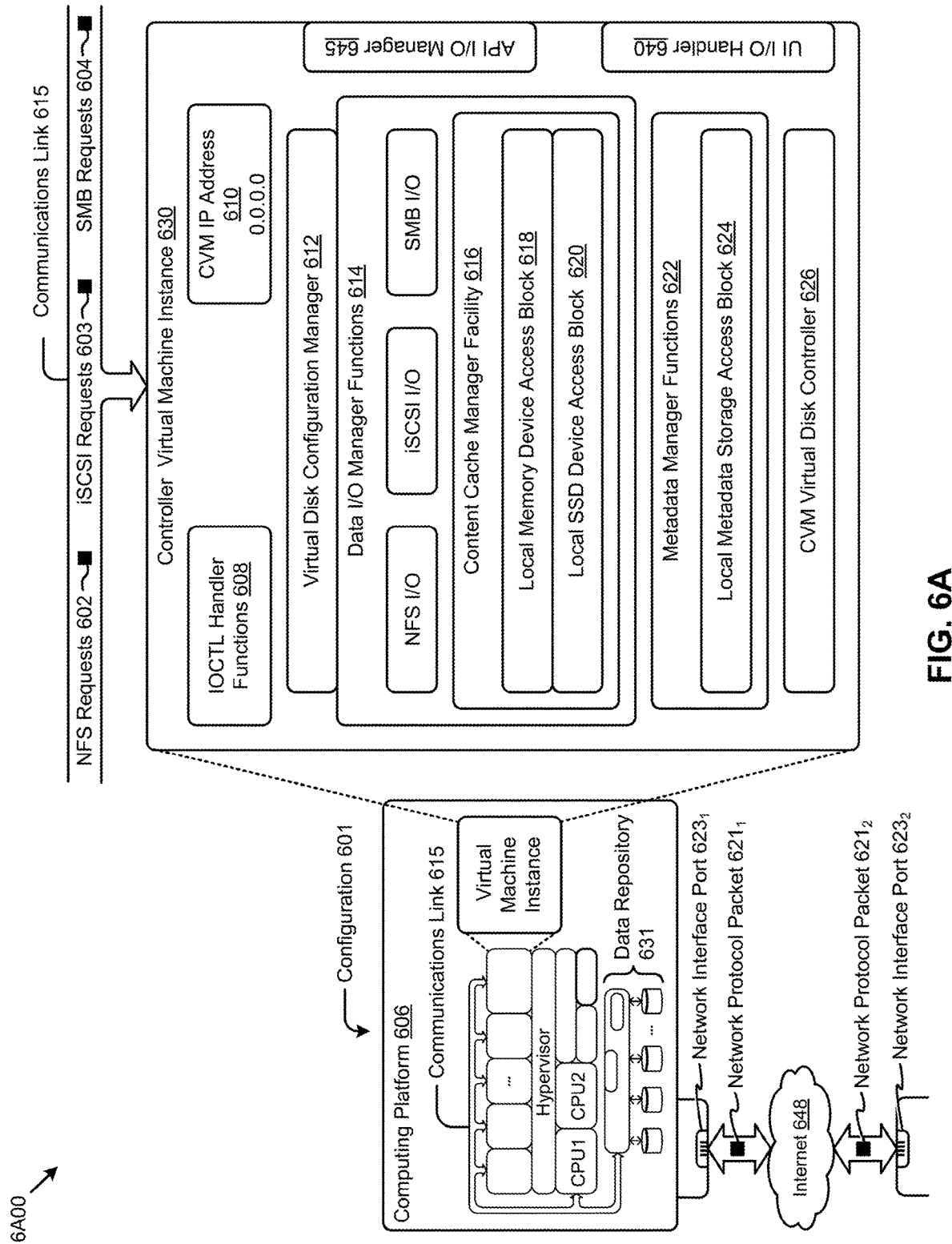
FIG. 6A and FIG. 6B depict virtualized controller architectures comprising collections of interconnected components suitable for implementing embodiments of the present disclosure and/or for use in the herein-described environments.

FIG. 6A depicts a virtualized controller as implemented by the shown virtual machine architecture 6A00. The virtual machine architecture comprises a collection of interconnected components suitable for implementing embodiments of the present disclosure and/or for use in the herein-described environments. Moreover, the shown virtual machine architecture 6A00 includes a virtual machine instance in a configuration 601 that is further described as pertaining to the controller virtual machine instance 630. A controller virtual machine instance receives block I/O (input/output or IO) storage requests as network file system (NFS) requests in the form of NFS requests 602, and/or internet small computer storage interface (iSCSI) block IO requests in the form of iSCSI requests 603, and/or Samba file system (SMB) requests in the form of SMB requests 604. The controller virtual machine (CVM) instance publishes and responds to an internet protocol (IP) address (e.g., CVM IP address 610). Various forms of input and output (I/O or IO) can be handled by one or more IO control handler functions (e.g., IOCTL functions 608) that interface to other functions such as data IO manager functions 614 and/or metadata manager functions 622. As shown, the data IO manager functions can include communication with a virtual disk configuration manager 612 and/or can include direct or indirect communication with any of various block IO functions (e.g., NFS IO, iSCSI IO, SMB TO, etc.).

In addition to block IO functions, the configuration 601 supports IO of any form (e.g., block IO, streaming IO, packet-based IO, HTTP traffic, etc.) through either or both of a user interface (UI) handler such as UI IO handler 640 and/or through any of a range of application programming interfaces (APIs), possibly through the shown API IO manager 645.

The communications link 615 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 630 includes a content cache manager facility 616 that accesses storage locations, possibly including local dynamic random access memory (DRAM) (e.g., through the local memory device access block 618) and/or possibly including accesses to local solid state storage (e.g., through local SSD device access block 620).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 631, which in turn can be formatted into any one or more storage areas, and which can comprise parameterized storage accessible by a key (e.g., a filename, a table name, a block address, an offset address, etc.). An external data repository 631 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 624. The external data repository 631 can be configured using a CVM virtual disk controller 626, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of a configuration 601 can be coupled by a communications link 615 (e.g., backplane, LAN, PSTN, wired or wireless network, etc.) and each instance may perform respective portions of sequences of instructions as may be required to practice embodiments of the disclosure.

The shown computing platform 606 is interconnected to the Internet 648 through one or more network interface ports (e.g., network interface port $623_1$ and network interface port $623_2$). The configuration 601 can be addressed through one or more network interface ports using an IP address. Any operational element within computing platform 606 can perform sending and receiving operations using any of a range of network protocols, possibly including network protocols that send and receive packets (e.g., network protocol packet $621_1$ and network protocol packet $621_2$).

The computing platform 606 may transmit and receive messages that can be composed of configuration data, and/or any other forms of data and/or instructions organized into a data structure (e.g., communications packets). In some cases, the data structure includes program code instructions (e.g., application code) communicated through Internet 648 and/or through any one or more instances of communications link 615. Received program code may be processed and/or executed by a CPU as it is received and/or program code may be stored in any volatile or non-volatile storage for later execution. Program code can be transmitted via an upload (e.g., an upload from an access device over the Internet 648 to computing platform 606). Further, program code and/or results of executing program code can be delivered to a particular user via a download (e.g., a download from the computing platform 606 over the Internet 648 to an access device).

The configuration 601 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments of a module include one or more special-purpose hardware components (e.g., power control, logic, sensors, transducers, etc.). Some embodiments of a module include instructions that are stored in a memory for execution to implement algorithms so as to facilitate operational and/or performance characteristics pertaining to managing containerized application extensions in distributed virtualization systems. In some embodiments, a module may include one or more state machines and/or combinational logic used to implement or facilitate the operational and/or performance characteristics pertaining to managing containerized application extensions in distributed virtualization systems.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing containerized application extensions in distributed virtualization systems). Such files or records can be brought into and/or stored in volatile or non-volatile memory.

Further details regarding general approaches to managing data repositories are described in U.S. Pat. No. 8,601,473 titled, "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled, "METHOD AND SYSTEM FOR IMPLEMENTING MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 6B:
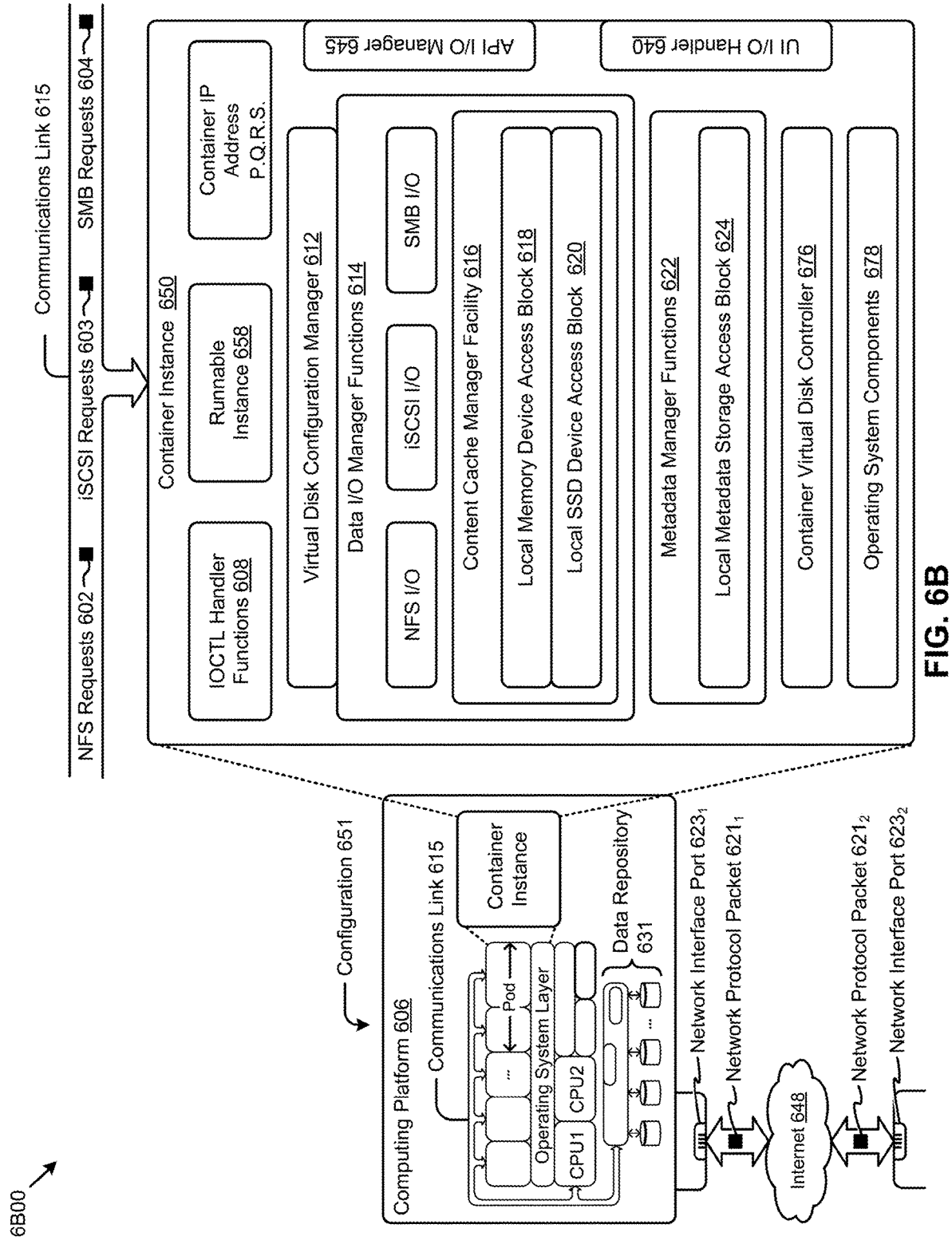

FIG. 6B depicts a virtualized controller implemented by a containerized architecture 6B00. The containerized architecture comprises a collection of interconnected components suitable for implementing embodiments of the present disclosure and/or for use in the herein-described environments. Moreover, the shown containerized architecture 6B00 includes a container instance in a configuration 651 that is further described as pertaining to the container instance 650. The configuration 651 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 650). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls-a", etc.). The container might optionally include operating system components 678, however such a separate set of operating system components need not be provided. As an alternative, a container can include a runnable instance 658, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 676. Such a container virtual disk controller can perform any of the functions that the aforementioned CVM virtual disk controller 626 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
maintaining a distributed virtualization system comprising a plurality of nodes connected over a network, the distributed virtualization system having a first node comprising a virtualized controller and a virtualized container service machine, the virtualized controller managing a storage pool that aggregates a first storage device locally attached to the first node and a second storage device locally attached to a second node;
receiving, at the virtualized controller, a command to invoke a containerized application extension from a graphical user interface, wherein the containerized application extension extends capabilities afforded to the distributed virtualization system by adding application features to an existing application; and
executing, at the virtualized container service machine, the containerized application extension, wherein the containerized application extension is invoked and accessed using the graphical user interface and the virtualized container service machine operates the containerized application extension by at least accessing data on the storage pool through the virtualized controller.

2. The method of claim 1, wherein the containerized application extension is communicatively coupled to a containerized application via an application programming interface and the containerized application extension is separate from the containerized application.

3. The method of claim 1, further comprising creating the virtualized container service machine responsive to receiving the command.

4. The method of claim 1, wherein operations pertaining to the containerized application extension are facilitated at least in part by a container daemon at the virtualized container service machine.

5. The method of claim 1, wherein a set of attributes describing a plurality of containerized application extensions managed by the virtualized container service machine is stored in an application extension database.

6. The method of claim 1, wherein the containerized application extension comprises at least one application programming interface (API), the API facilitating communication with at least one of, the graphical user interface, the virtualized controller, or a set of external resources.

7. The method of claim 1, wherein the containerized application extension comprises at least one of, a containerized application extension server, a containerized application extension user interface driver, or a set of container libraries.

8. A non-transitory computer readable medium having stored thereon a sequence of instructions which, when executed by a processor perform a set of acts comprising:
maintaining a distributed virtualization system comprising a plurality of nodes connected over a network, the distributed virtualization system having a first node comprising a virtualized controller and a virtualized container service machine, the virtualized controller managing a storage pool that aggregates a first storage device locally attached to the first node and a second storage device locally attached to a second node;
receiving, at the virtualized controller, a command to invoke a containerized application extension from a graphical user interface, wherein the containerized application extension extends capabilities afforded to the distributed virtualization system by adding application features to an existing application; and
executing, at the virtualized container service machine, the containerized application extension, wherein the containerized application extension is invoked and accessed using the graphical user interface and the virtualized container service machine operates the containerized application extension by at least accessing data on the storage pool through the virtualized controller.

9. The computer readable medium of claim 8, wherein the containerized application extension is communicatively coupled to a containerized application via an application programming interface and the containerized application extension is separate from the containerized application.

10. The computer readable medium of claim 8, the set of acts further comprising creating the virtualized container service machine responsive to receiving the command.

11. The computer readable medium of claim 8, wherein operations pertaining to the containerized application extension are facilitated at least in part by a container daemon at the virtualized container service machine.

12. The computer readable medium of claim 8, wherein a set of attributes describing a plurality of containerized application extensions managed by the virtualized container service machine is stored in an application extension database.

13. The computer readable medium of claim 8, wherein the containerized application extension comprises at least one application programming interface (API), the API facilitating communication with at least one of, the graphical user interface, the virtualized controller, or a set of external resources.

14. The computer readable medium of claim 8, wherein the containerized application extension comprises at least one of, a containerized application extension server, a containerized application extension user interface driver, or a set of container libraries.

15. The computer readable medium of claim 8, wherein the command corresponds to a download request for the containerized application extension and registration of the containerized application extension.

16. The computer readable medium of claim 8, wherein at least one of, the virtualized controller, or the virtualized container service machine, is at least one of, a virtual machine, or a container.

17. The computer readable medium of claim 8, wherein the virtualized container service machine is implemented in at least one of, the distributed virtualization system, or one or more bare metal servers.

18. The computer readable medium of claim 8, further comprising at least one of, a list operation, a download operation, an install operation, a start operation, a stop operation, a pause operation, or a delete operation.

19. The computer readable medium of claim 8, wherein the virtualized controller comprising a user interface module, a container service module, and an application extension database, the user interface module to generate a graphical user interface for a user, the container service module to receive a user command from the user interface module and generate a container service message to the virtualized container service machine, the application extension database containing a set of attributes describing a plurality of containerized application extensions managed by the virtualized container service machine, and the command to invoke the containerized application extension from the graphical user interface is received at a user interface module.

20. A system comprising:
   a storage medium having stored thereon a sequence of instructions; and
   one or more processors that execute the sequence of instructions to cause the one or more processors to perform a set of acts, the set of acts comprising:
   maintaining a distributed virtualization system comprising a plurality of nodes connected over a network, the distributed virtualization system having a first node comprising a virtualized controller and a virtualized container service machine, the virtualized controller managing a storage pool that aggregates a first storage device locally attached to the first node and a second storage device locally attached to a second node;
   receiving, at the virtualized controller, a command to invoke a containerized application extension from a graphical user interface, wherein the containerized application extension extends capabilities afforded to the distributed virtualization system by adding application features to an existing application; and
   executing, at the virtualized container service machine, the containerized application extension, wherein the containerized application extension is invoked and accessed using the graphical user interface and the virtualized container service machine operates the containerized application extension by at least accessing data on the storage pool through the virtualized controller.

21. The system of claim 20, wherein the containerized application extension is communicatively coupled to a containerized application via an application programming interface and the containerized application extension is separate from the containerized application.

* * * * *